US012442221B2

(12) United States Patent
Di Sario et al.

(10) Patent No.: US 12,442,221 B2
(45) Date of Patent: Oct. 14, 2025

(54) ELECTROMECHANICAL LOCKING DEVICE

(71) Applicant: DORMAKABA SCHWEIZ AG, Wetzikon (CH)

(72) Inventors: Franco Di Sario, Wetzikon (CH); Markus Zahner, Wetzikon (CH)

(73) Assignee: DORMAKABA SCHWEIZ AG, Wetzikon (CH)

( * ) Notice: Subject to any disclaimer, the term of this patent is extended or adjusted under 35 U.S.C. 154(b) by 0 days.

(21) Appl. No.: 18/714,974

(22) PCT Filed: Dec. 2, 2022

(86) PCT No.: PCT/EP2022/084218
§ 371 (c)(1),
(2) Date: May 30, 2024

(87) PCT Pub. No.: WO2023/099738
PCT Pub. Date: Jun. 8, 2023

(65) Prior Publication Data

US 2024/0426136 A1 Dec. 26, 2024

(30) Foreign Application Priority Data

Dec. 3, 2021 (EP) .................................... 21212266

(51) Int. Cl.
*E05B 47/00* (2006.01)
*E05B 19/00* (2006.01)

(52) U.S. Cl.
CPC .......... *E05B 47/0012* (2013.01); *E05B 19/00* (2013.01); *E05B 2047/0017* (2013.01); *E05B 2047/0084* (2013.01)

(58) Field of Classification Search
CPC .. E05B 27/0082; E05B 29/0066; E05B 19/00; E05B 47/0005; E05B 47/0012;
(Continued)

(56) References Cited

U.S. PATENT DOCUMENTS

| | | | | |
|---|---|---|---|---|
| 4,939,915 A * | 7/1990 | Vonlanthen | E05B 47/063 | 70/277 |
| 5,839,305 A * | 11/1998 | Aston | E05B 47/063 | 70/283.1 |
| 7,966,854 B2 * | 6/2011 | Imedio | E05B 47/0642 | 192/69.62 |

FOREIGN PATENT DOCUMENTS

| | | |
|---|---|---|
| DE | 19524567 C1 | 10/1996 |
| DE | 102006012196 B3 | 8/2007 |

(Continued)

OTHER PUBLICATIONS

International Search Report for International Application No. PCT/EP2022/084218, dated Feb. 24, 2023, 2 pages, English translation.

(Continued)

*Primary Examiner* — Suzanne L Barrett
(74) *Attorney, Agent, or Firm* — CANTOR COLBURN LLP

(57) ABSTRACT

An electromechanical locking device for a closure element, includes a stator and a rotor, the rotor being mounted in the stator. The locking device includes an extension element, wherein the extension element can be moved between an insert position and a withdrawal position in the axial direction, in particular in a linear manner. A closing device having such a locking device is also related.

17 Claims, 7 Drawing Sheets

(58) Field of Classification Search
CPC ............. E05B 47/0611; E05B 47/0619; E05B 47/0626; E05B 47/063; E05B 2047/0017; E05B 2047/0084; E05B 2047/0085; H02K 5/04; H02K 16/02
USPC .......................................................... 70/278.1
See application file for complete search history.

(56) References Cited

FOREIGN PATENT DOCUMENTS

| | | | |
|---|---|---|---|
| EP | 2643536 | A2 | 10/2013 |
| EP | 1904702 | B1 | 12/2015 |
| EP | 1914368 | B1 | 6/2018 |
| WO | 9602721 | A1 | 2/1996 |
| WO | 2012072066 | A2 | 6/2012 |

OTHER PUBLICATIONS

Written Opinion for International Application No. PCT/EP2022/084218, dated Feb. 24, 2023, 3 pages, English translation.

* cited by examiner

ELECTROMECHANICAL LOCKING DEVICE

CROSS-REFERENCE TO RELATED APPLICATIONS

This application is a 35 U.S.C. § 371 National Stage patent application of PCT/EP2022/084218 filed 2 Dec. 2022, which claims the benefit of European patent application 21212266.7 filed 3 Dec. 2021, the disclosures of which are incorporated herein by reference in their entirety.

TECHNICAL FIELD

The disclosure relates to an electromechanical barrier device according to the preamble of claim 1. Such a barrier device substantially has a stator and a rotor, with the rotor being rotatably mounted in the stator. Furthermore, the disclosure relates to a locking device equipped with a barrier device according to claim 15. Locking devices are available in numerous designs, for example in the form of a locking cylinder for doors, gates or for example windows. Furthermore, the disclosure relates to a locking system according to claim 17.

BACKGROUND

EP 1 914 368 B1 discloses a locking cylinder with a barrier element which, in a first position, is located both in a rotor and in a stator and thus blocks a rotation of the rotor relative to the stator. In a second position of the barrier element, however, the barrier element is located fully in the rotor such that the rotor can rotate relative to the stator. To move from the first position into the second position, a blocking element in the rotor is rotated from a blocking position into a release position. In the release position, the blocking element allows the movement of the barrier element from the first position into the second position. The locking cylinder is designed such that a conventional key must be used in order to ultimately transfer mechanically and geometrically engraved locking information to correspondingly assigned locking elements in the locking cylinder such that the locking authorisation is recognised. The disadvantage is that the electromechanical barrier device can only be operated with a conventional key that is elongated in an insertion direction and has to be inserted deep into the rotor.

EP 1 904 702 B1 discloses an electromechanical barrier device. A blocking element designed as a barrier disc is designed to allow a barrier element to retract into the rotor and thus to enable the rotation of the rotor or, if there is no electronic locking authorisation, to prevent retraction. A key channel extends through the barrier device past the blocking element. A rotating element for mechanically resetting the blocking element projects into a key channel of the barrier device. What is critical here is that this sensitive part of the barrier device is accessible via the key channel and can therefore be manipulated.

SUMMARY

The disclosure therefore further develops a generic barrier device such that the barrier device has a high level of security against manipulation and thus against unauthorised unlocking of the barrier device.

The advantage is achieved by the limitations set forth in the independent claim. Advantageous further developments of the device are indicated in the dependent device claims, the description and in the figures. Furthermore, the advantage is also achieved by providing a locking device and a locking system according to the claims. Advantageous further developments of the locking device and the locking system are indicated in the description and in the figures. Features and details described in connection with the barrier device according to the disclosure thereby also apply in connection with the locking device according to the disclosure and the locking system according to the disclosure and vice versa. In this case, the features mentioned in the description and in the claims may each be essential to the disclosure individually by themselves or in combination.

According to the disclosure, it is provided that the barrier device comprises an extension element, with the extension element being able to be moved, in particular linearly, in the axial direction between an insertion position and a removal position.

Because the barrier device comprises the extension element according to the disclosure, the extension element can assume at least one task that a key would perform in the prior art. The extension element as part of the barrier device remains in the barrier device when a key is removed. Because a task that would be performed by a key in the prior art is performed by the extension element as part of the barrier device, it is possible to better protect the interior of the barrier device against manipulation.

The barrier device can comprise at least one wall behind which the extension element is at least partially arranged. "Behind" is to be understood from the perspective of the user who operates the barrier device. Preferably, the extension element is moved linearly in the axial direction, thus imitating the movement of a key. The insertion position is thereby a position in which the extension element is further away from the user than in the removal position. For example, the extension element is arranged further behind the wall in the insertion position than in the removal position.

If the extension element moves linearly, the extension element can alternatively be referred to as a slider.

It can be provided that the barrier device comprises a force accumulator, in particular a spring, in order to push the extension element into the removal position.

The barrier device is preferably used to bolt a spatial area. In particular, the spatial area is fixed. For example, the spatial area may be a room in a building, for example an office, an apartment or a house, or a storage room, for example a cupboard, a mailbox, a chest, a box, a safe or a drawer. In particular, the barrier device is used to be inserted in a particularly door-like closure element, for example a front door, an apartment door, a room door, a cupboard door, a mailbox flap or the front of a drawer, or to be attached to a closure element. Preferably, the stator of the barrier device is at least indirectly connected to the closure element in a rotationally fixed manner.

The barrier device can have a driver or can be connectable to a driver. A rotation of the rotor of the barrier device serves to rotate the driver.

In the insertion position, the extension element is arranged closer to the driver than in the removal position.

The driver is preferably designed as an eccentric.

The driver can be designed as a locking lug. It may be that a rotation of the driver in a first direction serves to transfer the closure element from an unbolted state to a bolted state. It may also be that a rotation of the driver in a second direction serves to transfer the closure element from a bolted to an unbolted state. For example, the barrier device can be inserted at least indirectly into a mortise lock. In this case, a rotation of the driver can cause the bolt of the mortise lock to move. For example, the rotation of the driver in a first direction can cause the bolt to extend and thus bring about the bolted state of the closure element. A rotation of the driver in a second direction can, for example, cause the bolt to retract and thus bring about the unbolted state of the closure element.

Alternatively, the driver itself can act as a bolt. For example, the rotation of the driver in a first direction can cause the driver to assume a bolting position. The rotation of the driver in a second direction can, for example, cause the driver to assume an unbolting position.

In a preferred embodiment, the barrier device is designed as an installation device. The installation device is designed to be inserted into a locking device housing of a locking device. Preferably, the installation device is fixed in the locking device housing in a rotationally fixed manner by means of a fastening element. Thus, when the locking device is in the assembled state, the stator of the barrier device and the locking device housing form a common fixed unit. The locking device housing is used in particular for insertion into or attachment to the closure element. The locking device can be designed, for example, as a locking cylinder, in particular as a double cylinder or half cylinder, as a knob cylinder, as a furniture cylinder or as a padlock.

The barrier device, in particular the rotor, can be connected or connectable to a knob or a key in order to transmit a mechanical torque to the rotor.

If the barrier device is designed as an installation device, it is preferably provided that the barrier device comprises a connecting section in order to be connected to a driver.

Alternatively, it can be provided that the barrier device itself is designed as a locking cylinder, in particular as a double cylinder or half cylinder, as a knob cylinder, as a furniture cylinder or as a padlock. The stator also serves here as a housing for insertion into or attachment to the closure element. In this case, the barrier device can comprise the driver.

Alternatively, the barrier device can be provided for a switching element. This means that the switching element can only be operated by authorised users. A driver of the switching element can be used here to actuate a switch or button. Thus, the barrier device can be used in a switching element, in particular in a key switch, or correspond to a key switch.

The barrier device according to the disclosure can comprise a barrier element. In a first position, the barrier element prevents the rotor from rotating relative to the stator. In a second position, the barrier element allows the rotor to rotate relative to the stator. The barrier element can be moved between the first and the second position.

The barrier element can be mounted in the rotor so as to be movable, in particular linearly movable. It can be provided that the stator comprises a barrier element recess into which the barrier element engages in the first position. In the second position, the barrier element is preferably disengaged from the barrier element recess.

The electromechanical barrier device comprises in particular an electromechanical actuator, in particular an electric motor. The actuator is used to enable the barrier element to be moved into the second position.

The barrier device can comprise an electronic control device, in particular a processor and/or a controller, to control the actuator. The control device can also comprise an electronic memory.

The barrier device can comprise a transmission device. The transmission device can be designed as a transmitting and receiving unit, as a biometric sensor, as a keypad for inputting a PIN and/or as a contact element for making electrical contact with an in particular electronic key. The transmitting and receiving unit can be designed to communicate with a mobile unit, in particular a mobile telephone or a card, by wireless near-field communication, in particular RFID or Bluetooth Low Energy.

The transmission device can be used to send and/or receive electronic data that make it possible to determine a user's authorisation to unbolt the spatial area. For example, the transmission device can receive an authorisation code and/or an authorisation time window that is verified by the control device. If the verification is completed with a positive result, the actuator can be controlled to allow a movement of the rotor in the stator. The actuator is controlled to allow the barrier element to move into the second position.

Alternatively, the transmission device can receive an opening command, based on which the barrier element is electromechanically moved into the second position or the movement into the second position is electromechanically released.

The transmission device serves in particular additionally or alternatively to transmit electrical energy to the barrier device. The electrical energy can be provided for actuating the actuator and/or the control device. The electrical energy can be provided by an, in particular electromechanical, energy storage device of the key.

Preferably, the barrier device according to the disclosure comprises a blocking element. It is preferably provided that the blocking element allows the movement of the barrier element from the first position into the second position in a release position and prevents the movement of the barrier element from the first position into the second position in a blocking position.

The actuator preferably serves to allow a movement of the blocking element from the blocking position into the release position. The actuator can thus move the blocking element into the release position and/or, for example, cause the blocking element to move into the release position by tensioning a spring element.

It can be provided that the blocking element is arranged on the output shaft of the actuator designed as an electric motor. Preferably, the actuator allows a rotation of the blocking element from the blocking position into the release position. Preferably, the actuator rotates the blocking element from the blocking position into the release position. This allows for a very space-saving design.

It can further be provided that the extension element extends in the axial direction at least in the insertion position along the electronic control device, along the electromechanical actuator and/or past the barrier element. The electronic control device can in particular serve to control the electromechanical actuator in order to enable the barrier element to move from a first position into a second position. The actuator can hereby move the blocking element from the blocking position into the release position. It is also conceivable that the extension element extends in the axial direction past the blocking element.

The extension element preferably travels through the essential length along the rotor axis of the locking device and is received axially movable with respect to the rotor axis. The extension element is located in the interior of the barrier device where the barrier mechanism is located. Thus, in particular the control device, the actuator, the blocking element and/or the barrier element are protected against manipulation by the wall.

The barrier device preferably comprises a key channel for inserting a key. The wall can be arranged at the end of the key channel. The extension element can protrude through the wall and be arranged partly in the key channel and partly shielded by the wall in the interior of the barrier device.

The extension element is preferably moved from the removal position into the insertion position when a key is inserted and/or moved from the insertion position into the removal position when a key is removed.

On the one hand, the extension element can serve to interact with an electronic key, on the other hand, the extension element can serve to interact with components of the barrier device such that, for example, an axial position of the extension element in or relative to the barrier device determines the transfer of the state of the barrier device, for example from a released state to a locked state. Thus, in the locked state, the barrier element can be located in the first position and in the released state, the barrier element can be located in the second position or can be moved into the second position.

Thus, the extension element serves as an active component for the interaction between the key and the components relevant to the locked or released state of the barrier device. As a result, an electronic key can be used that is significantly shorter than a conventional key with mechanical-geometric locking information. In addition, the use of an extension element between the key and the active components of the barrier device offers the advantage of improved protection against manipulation, since the active components in the barrier device, for example the barrier element, the blocking element, the actuator and/or the control device, which decide on the released or locked state of the barrier device, can be kept deeper inside the locking device.

The key is preferably designed without a mechanical coding. Accordingly, the barrier device according to the disclosure is designed without a mechanically coded tumbler. Therefore, only an electronic secret locking code can be used to determine whether or not the user has authorisation.

The extension element is preferably designed to establish an operative connection between the rotor and the driver for transmitting a torque from the rotor to the driver.

The barrier device can, for example, comprise a coupling part or be connectable to a coupling part. If the barrier device is designed as an installation device, the barrier device can in particular be connectable to a coupling part. If the barrier device itself is designed as a locking cylinder, the barrier device comprises the coupling part.

The coupling part can be movable by the extension element such that the coupling part establishes an operative connection between the rotor and the driver. In particular, it is provided that a movement of the extension element from the removal position into the insertion position causes a movement of the coupling part, through which the coupling part can come into operative connection with the driver.

In particular, the barrier device is designed to transmit the torque from the rotor to the driver without involving the extension element. In other words, the extension element does not serve to transfer the torque from the rotor to the driver. The torque can either be transmitted directly to the driver or via the coupling part. This allows the extension element to be designed in a filigree manner. The extension element is thereby displaceably mounted in the barrier device and in particular in the rotor here.

The rotor can comprise a connecting section, with the connecting section comprising a guide for guiding the coupling part and/or for transmitting a torque from the rotor to the coupling part. The connecting section is preferably arranged outside the stator. The extension element preferably bridges at least a distance between one end of the key channel and the coupling part and/or the connecting section.

The extension element is preferably designed to displace the coupling part.

It is preferably provided that each insertion movement of a key into an end position acts on the extension element. In particular, each insertion movement of the key into an end position acts on the extension element in such manner that the extension element is moved from the removal position into the insertion position. In other words, there is no spring located between the extension element and the key that, under compression, allows the key to move into the end position without moving the extension element.

It can be provided that the extension element acts on the coupling part without an intermediate force accumulator. A force accumulator, in particular the spring, can be provided to push the extension element in the direction of the removal position. However, the force accumulator is not used to charge itself if the extension element and the coupling part have different movement possibilities, for example if the coupling part cannot operatively connect with the driver due to a current spatial arrangement.

Rather, the coupling part is preferably designed in a plurality of parts with a spring. By means of the spring, mechanical energy can be stored in the case of a current spatial arrangement of the coupling part in relation to the driver, which prevents engagement. If the spatial arrangement of the coupling part to the driver allows engagement, the coupling part engages by means of the spring force of the spring of the coupling part.

The extension element can be designed to cooperate with the coupling part in the axial direction without a form-fitting connection. This makes it possible for the extension element to move into the removal position without directly moving the coupling part. However, it can be provided that the coupling part follows the extension element at least partially in a spring-driven manner.

The extension element can be designed to cooperate with the coupling part in the direction of rotation without a form-fitting connection. This makes it possible in particular to transfer the torque to the coupling part without the involvement of the extension element.

The extension element can be designed to cooperate with the coupling part without a form-fitting connection. In particular, the extension element presses the coupling part in the direction of the driver without forming a connection with the coupling part.

The extension element can be designed such that the operative connection between the coupling part and the driver can only be effectively broken in the removal position. Effectively break is to be understood as a breaking process in which the coupling part does not come into operative connection with the driver by spring force when the rotor rotates. If the extension element is located in the insertion position, the coupling part is preferably located in operative connection with the driver or can come into operative connection by the force of the spring when the rotor rotates.

It can be provided that the extension element in the removal position allows the operative connection of a coupling part with the driver to be broken. In the removal position, the extension element only allows the effective breaking of the operative connection between a coupling part and the driver. Thus, the extension element does not actively move the coupling part out of the operative connection with the driver, but only creates a prerequisite for the coupling part to come out of the operative connection with the driver.

Additionally or alternatively, it can be provided that the extension element leaves the coupling part, in particular a coupling element of the coupling part, in connection with the driver when the extension element moves from the insertion position into the removal position.

The coupling element can establish the operative connection between the rotor and the driver. The coupling element can in particular be guided in the guide of the rotor. Preferably, the coupling element remains in the coupling position, i.e. in operative connection with the driver, when the extension element moves into the removal position. The coupling element thus ensures that the coupling position is maintained.

Preferably, the extension element can be moved independently of the coupling element.

Preferably, the extension element comprises an engagement element for engaging the key. This makes it possible for the extension element to always be moved from the insertion position into the removal position when the key is removed. This ensures that the extension element is always located in the removal position when the key is removed. Thus, the engagement element is designed to be in operative connection with the key in such manner that the extension element can be moved, in particular pulled, from the insertion position into the removal position when the key is removed.

It can be provided that the extension element is usually moved into the removal position by means of the force accumulator. The pulling of the extension element by the engagement of the engagement element in the key can be provided if the force accumulator is not able to move the extension element into the removal position due to manipulation.

Preferably, the engagement element is designed to be resilient. Thus, the barrier device preferably comprises the key channel for inserting a key, with the extension element comprising a resilient engagement element for engaging the key.

Preferably, the engagement element is designed to be in operative connection with the key under mechanical tension in such manner that the extension element is moved and in particular pulled from the insertion position into the removal position when the key is removed. Thus, the spring effect pushes the engagement element to disengage from the key.

The barrier device, in particular the stator, advantageously comprises a contact surface for the extension element, with the contact of the engagement element on the contact surface, in particular under tension, producing the operative connection with the key. The barrier device, in particular the rotor, preferably comprises a cavity in which the engagement element comes out of operative connection with the key.

The extension element can be guided linearly in a guide of the rotor.

Preferably, the guide is configured as an open recess of the rotor such that the recess is closed off from the stator. For example, the stator can therefore comprise the contact surface that presses the engagement element into engagement with the key.

The guide preferably opens in a cavity. The cavity preferably merges into the key channel. The contact surface pushes the engagement element into engagement with the key, in particular against the spring effect. In the cavity, which has a larger diameter than that of the guide, there is, however, sufficient space for the engagement element to be able to disengage from the key, in particular due to the spring effect.

The engagement element comes out of operative connection with the key, in particular due to the spring effect.

The engagement element can comprise a sliding surface, with the engagement element being designed such that the sliding surface slides along a corresponding sliding surface of the key and thus the engagement element comes out of operative connection with the key.

It can be provided that the engagement element is disengaged from the key by the spring effect and/or by the sliding surface. Preferably, both the spring effect and the sliding surface contribute to the engagement element disengaging from the key. The extension element further comprises an engagement surface for engaging the key so that the extension element can be moved, in particular slid, by the key from the removal position into the insertion position.

The extension element is in particular designed in one piece and/or angled, with in particular a section of the extension element, which is arranged close to the rotor axis, serving to move the coupling part.

In order to produce the spring effect of the engagement element, the engagement element comprises a resilient section via which the engagement element is connected to the remaining extension element. For example, the resilient section can be designed as a leaf spring.

It can be provided that the leaf spring opens in a spring head of the engagement element. The spring head can comprise the sliding surface.

It can be provided that the engagement element, in particular the spring head, comprises an inclination. By means of the inclination, the key can deflect the engagement element during insertion, in particular under tension of the resilient section. In particular, the deflection causes the key and the engagement element to slide over each other such that the spring head can engage into a depression of the key.

The barrier device preferably comprises the blocking element, with the blocking position and the release position being able to be assumed by the blocking element. The extension element and the blocking element are preferably designed such that the extension element in the insertion position prevents, in particular blocks, a movement of the blocking element from the release position into a blocking position.

Preferably, the blocking element has a retaining cam. The retaining cam is arranged in particular eccentrically on the remaining blocking element. In particular, the blocking element with the retaining cam in the release position rests on the extension element in the insertion position. For this purpose, the extension element can have a stop. As a result, the extension element blocks the movement, in particular the rotation, of the blocking element from the release position. This ensures in particular that the release position of the blocking element can only be assumed when the key is actually inserted and the extension element is arranged in the insertion position.

The retaining cam can be formed integrally, in particular monolithically, with the remaining blocking element.

A starting position is a blocking position of the blocking element in which the blocking element is located when the barrier device is not actuated. In particular, the key has been removed. The extension element and the blocking element are preferably designed such that the extension element in the insertion position blocks a movement of the blocking element from the release position into the starting position.

For example, a spring element can be provided which acts on the blocking element. The spring element can be tensioned in the release position of the blocking element and push the blocking element into a blocking position, in particular into the starting position. In the insertion position, the extension element blocks the blocking element from being moved from the release position into a blocking position by the force of the spring element.

The spring element can, for example, be designed as a torsion spring.

The extension element can have the stop, while the blocking element has the retaining cam formed thereon, which is held against the stop by the spring element when the blocking element is located in the release position and the extension element is located in the insertion position. In the insertion position, the retaining cam can come to rest against the stop.

It is preferably provided that the extension element and the blocking element are designed such that the extension element in the removal position enables a movement of the blocking element from the release position into a blocking position, in particular into the starting position. In particular, the extension element is located out of operative connection with the blocking element in the removal position, such that the blocking element is moved from the release position into the blocking position by the force of the spring element. In the removal position, in particular, the stop of the extension element is spaced apart from the retaining cam of the blocking element. This means that the retaining cam can no longer rest on the stop. In the removal position of the extension element, the retaining cam can preferably rotate freely such that the blocking element cannot be held by the stop and the blocking element cannot maintain the release position.

If the key is removed and the extension element is moved from the insertion position back into the removal position, the extension element again disengages from the blocking element such that the blocking element is moved from the release position back into the locking starting position, in particular by the spring element, in which the barrier element is again held in the first position.

The barrier device comprises the blocking element, with in particular the starting position and the release position being able to be assumed by the blocking element by rotating the blocking element.

For example, the blocking element can be designed like a disc.

The extension element and the blocking element can be designed such that in the insertion position of the extension element, a movement of the blocking element from the starting position into the release position is blocked in at least one direction of rotation.

The extension element and the blocking element can be designed such that in the insertion position of the extension element, a movement of the blocking element from the starting position into the release position is possible in a first direction of rotation and is blocked in a second direction of rotation. In particular, a rotation angle between the starting position and the release position in the first direction of rotation can be greater than a rotation angle between the starting position and the release position in the second direction of rotation. This prevents manipulation by unauthorised rotation of the blocking element.

Preferably, the restoring force of the spring element is temporarily stronger during a rotation in the second direction of rotation than at least during a rotation in the first direction of rotation.

The actuator preferably rotates the blocking element in the first direction of rotation so that the blocking element moves from the starting position into the release position.

The spring element preferably rotates the blocking element in the first direction of rotation from the release position into the starting position.

A further advantage is achieved in that the rotational movement of the blocking element from the starting position into the release position and from the release position back into the starting position of the blocking element takes place in the same direction of rotation, namely in the first direction of rotation.

The rotor has a first rotor section and a second rotor section, with the first rotor section having a larger diameter than the second rotor section, with the extension element extending over the first and the second rotor section or being arranged to be longitudinally movable therein. The cavity in which the engagement element is disengaged from the key is preferably located in the first rotor section.

For example, the first rotor section can correspond to a first rotor element. The second rotor section can correspond to a second rotor element. The first and second rotor elements are rigidly connected to each other.

It may be that the contact surface against which the engagement element rests is located in the region of the second rotor section.

The barrier device preferably comprises the transmission device for transmitting data and/or electrical energy from a key to the barrier device, with the transmission of data and/or electrical energy being interrupted when the key is removed.

The extension element preferably engages the key in a form-fitting manner, such that when the key is removed, the extension element always moves from the insertion position into the removal position. This ensures that the blocking element returns mechanically to a blocking position, in particular due to the force of the spring element, and that a rotation of the rotor is prevented by the barrier element.

Furthermore, according to the disclosure, a locking device is provided, with the locking device being designed with a barrier device as represented above and with a coupling part, with the coupling part being designed in a plurality of parts, with a first segment of the coupling part being designed to be moved by the extension element when the extension element moves from the removal position into the insertion position, with a second segment of the coupling part being provided to be connected to the driver in a rotationally fixed manner, with the first segment and the second segment being connected elastically, in particular via a spring. This makes it possible in particular to design the extension element as a single piece and/or in a filigree manner. The first segment can in particular be designed as a sliding element and the second segment as a coupling element.

The locking device can comprise a locking device housing in which the barrier device is received. Thus, the barrier device can be designed as an installation device.

The extension element according to the disclosure is in particular suitable for use in the compact installation device due to its one-piece design and/or its filigree construction.

The advantage of the disclosure is also achieved by providing a locking system with a barrier device and/or a locking device and a key. In particular, the key comprises a depression into which the extension element, in particular the engagement element, can engage. The key can comprise the corresponding sliding surface for cooperating with the sliding surface of the engagement element. The key can comprise an inclination for cooperating with the inclination of the engagement element.

BRIEF DESCRIPTION OF THE DRAWINGS

The disclosure will be explained in more detail below using an exemplary embodiment. Technical features with the same function are provided with identical reference numerals in the figures. They show.

DETAILED DESCRIPTION OF THE DRAWINGS

Figure 1:
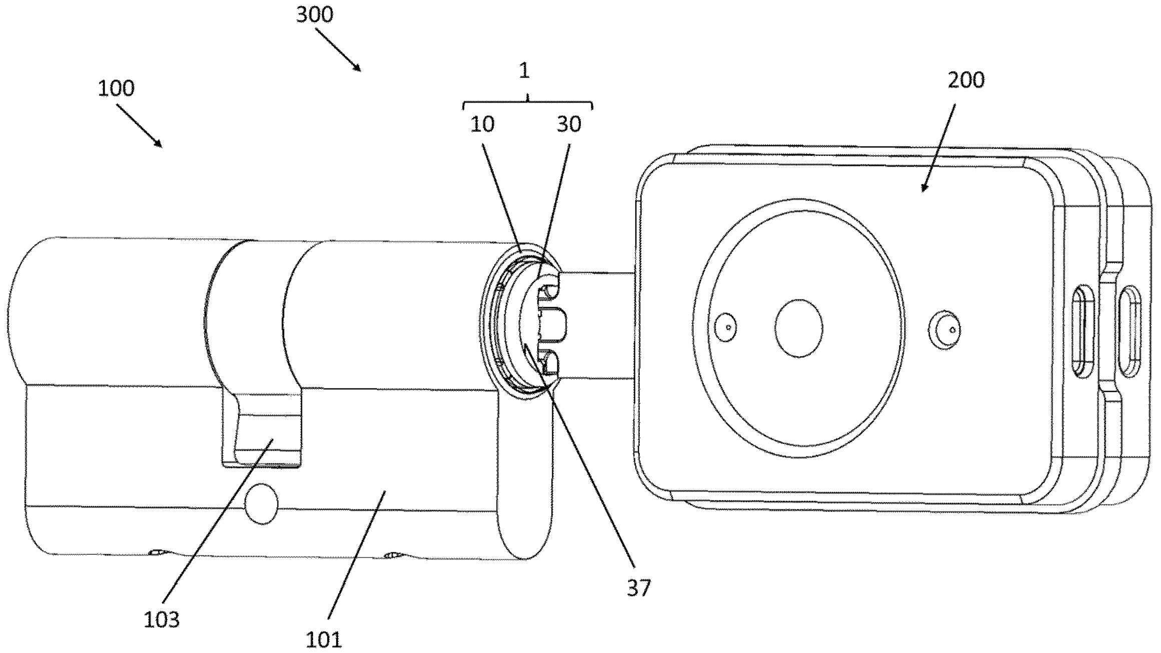
FIG. 1 a locking device according to the disclosure and a key, which together form a locking system according to the disclosure, FIG. 2 the locking device from FIG. 1 in a partially disassembled state, with a perspective view of a barrier device according to the disclosure, which is designed as an installation device, FIG. 3 the barrier device according to the disclosure from FIG. 2 without cover and a coupling part, FIG. 4 the barrier device from FIG. 3 without cover and stator body in an exploded representation showing the extension element according to the disclosure, FIG. 5 selected elements of the barrier device from FIG. 4, FIG. 6 selected elements of the barrier device from FIG. 4 in a side view, FIG. 7 a sectional representation through the barrier device showing the extension element according to the disclosure and FIG. 8 a detailed representation of the extension element arranged next to the electromechanical actuator assembly, FIG. 9 a detailed representation of the extension element, FIG. 10 a representation of a coupling part of the locking device from FIG. 1 and of an alternative coupling part for use in the locking device of FIG. 1, FIG. 11 a representation of selected elements of the barrier device 1 according to the disclosure from FIG. 2 and FIG. 12 a key of a locking system according to the disclosure.
Figure 2:
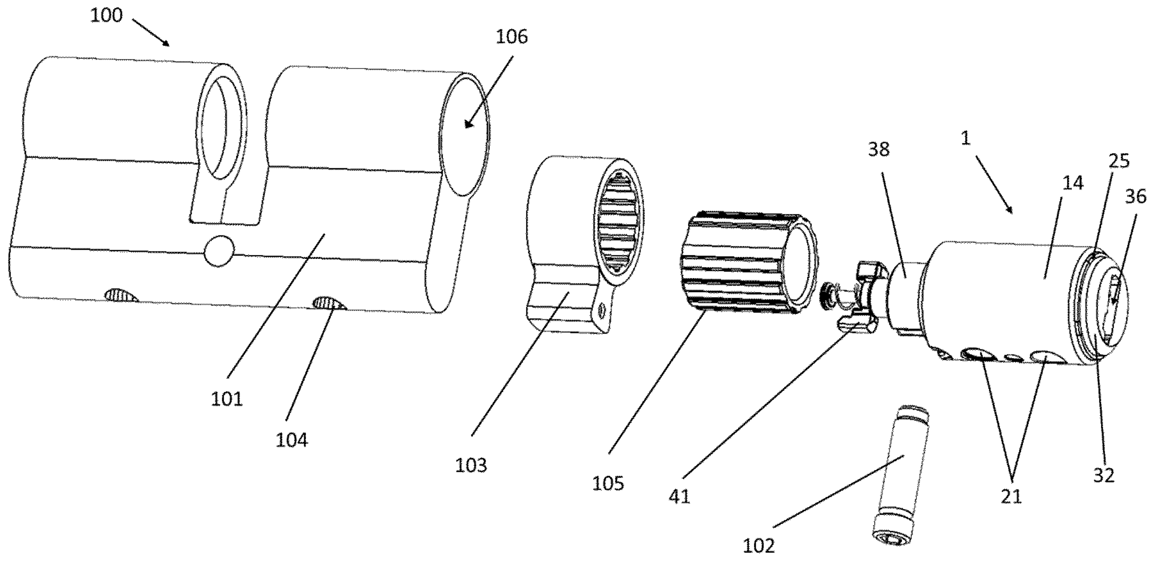

FIG. 1 and FIG. 2 show a locking device 100 in the form of a locking cylinder, as used in mortise locks, in order to unbolt a building door as a closure element or to bolt it by means of a bolt. For this purpose, the locking device 100 has a housing 101 with a recess in which a driver 103, which is designed as a locking lug, is rotatably arranged. The driver 103 is used to move a bolt in the bolting or unbolting direction.

In the right half of the housing 101 is inserted a barrier device 1 designed as an installation device according to an exemplary embodiment of the disclosure. The installation device 1 comprises a stator 10 arranged on the outside circumference, in which a rotor 30 of the installation device 1 is inserted so as to be rotatable about a rotor axis 35, which, for example, corresponds to the axis of rotation of the driver 103. The rotor 30 comprises, on its front side 37 facing away from the driver 103, a key channel 36 for inserting a shank of a key 200. The key 200 and the locking device 100 together form a locking system 300 according to the disclosure.

The key 200 carries an electronic secret locking code in the form of electronic data. The secret locking code can be used to determine a user's authorisation to unbolt the door. The key 200 is preferably designed without a mechanical coding. Therefore, only the electronic secret locking code can be used to determine whether or not the user has authorisation. The keys and the barrier devices can be identical here in terms of their external shape and thus also mechanically.

FIG. 2 shows the locking device 100 in a partially disassembled state. The housing 101 has, for example in both halves of the recess for the driver 103, recesses 104 in the lower region, of which the right-hand recess is provided with a reference numeral. The recesses 104 shown here extend perpendicular to the axis of rotation of the driver 103. The driver 103 has, for example, an inner contour that is not circular in cross-section, for example in the form of an internal toothing, into which an insert 105 engages preferably in a form-fitting manner. For this purpose, the insert 105 has an outer contour that is complementary to the inner contour of the driver 103, here in the form of an external toothing, such that both parts 103, 105 are arranged in a rotationally fixed manner with respect to one another.

A connecting section 38 of the installation device 1 projects into the insert 105. In the connecting section 38, a coupling part 41 is arranged in a guide 42 so as to be slidable. The coupling part 41 is designed in a plurality of parts and depending on the position of the coupling part 41, it can establish or release an operative connection between the rotor 30 and the driver 103, in particular via the insert 105. For this purpose, the coupling part 41 of the locking device 100 can engage in a form-fitting manner into an inner contour of the insert 105 not represented here. Here, the coupling part 41 is located in a coupling position. The guide 42 preferably forms a linear guide for the coupling part 41, such that the coupling part 41 is arranged to be movably guided along the rotor axis 35 of the rotor 30. The coupling part 41 can be moved in such manner that the coupling part 41 can be disengaged from the insert 105. Here, the coupling part 41 is located in a decoupling position, as represented in FIG. 3.

The installation device 1 has a cover 14 with which the installation device 1 is inserted into an associated insertion opening 106 of the housing 101. A fastening element 102, in the form of a screw, is screwed through the right-hand recess 104 from the underside of the housing 101 and through a left-hand through-opening 21 of the cover 14 of the stator 10 into a screw opening of a stator body 11 of the stator 10, which will be explained in more detail later. The screw 102 thus fixes the stator 10 in the housing 101. Furthermore, the key channel 36 for inserting the key 200 is designated here, which is formed in a first rotor element 32 of the rotor 30.

Figure 3:
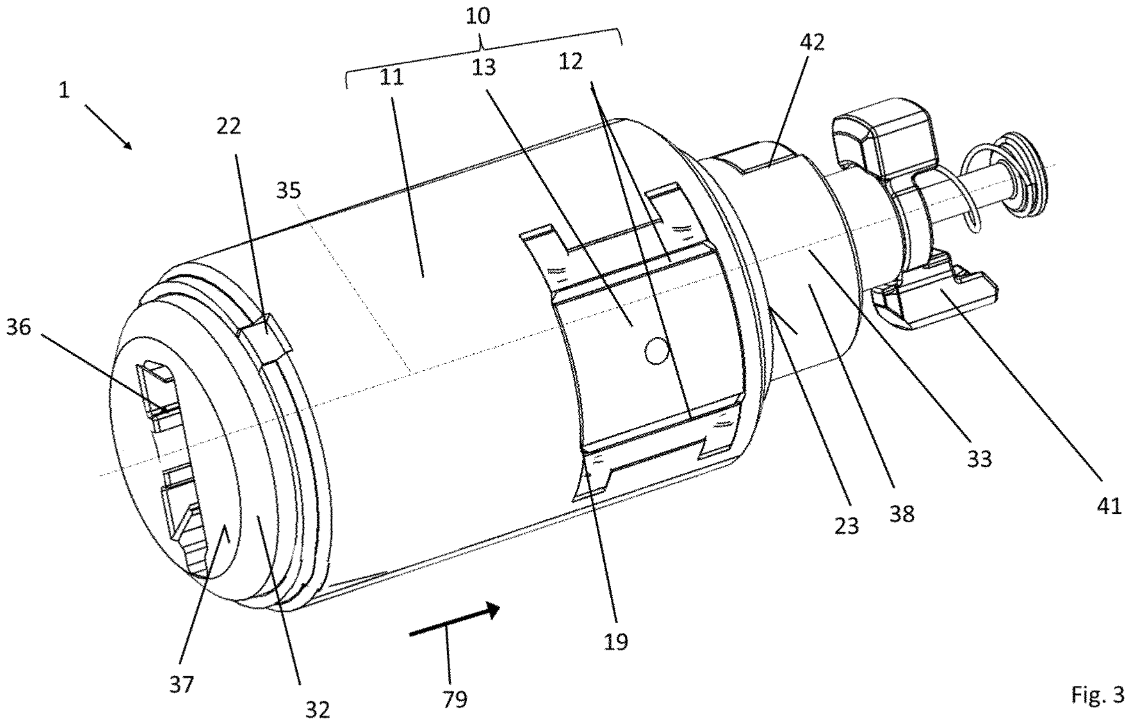

FIG. 3 shows the installation device 1 without the cover 14. The stator body 11 is also designed in the manner of a sleeve and has functional structures on the inside. The stator body 11 has a recess 19 into which a stator insert element 13 is inserted. Stator elements 12, which will be explained in more detail later, are attached or arranged on a side of the stator insert element 13 facing the interior of the stator body 11. The stator elements 12 are movably mounted on the stator insert element 13 and the stator body 11. The stator elements 12 remain in the remaining stator 10 when the rotor 30 rotates.

The rotor 30 comprises the first rotor element 32, which at the same time forms a first rotor section, and a second rotor element 33, which at the same time forms a second rotor section.

The rotor 30 is rotatable in the stator body 11 of the stator 10, but is mounted stationary in the direction of its rotor axis 35, which runs parallel to the insertion direction of the key 200 into the key channel 36. The coupling part 41 is arranged in a rotationally fixed manner on the second rotor element 33 of the rotor 30 of the installation device 1. Both rotor elements 32, 33 are reversibly detachable and rigidly fastened to each other and arranged so as to be rotatable together in the stator body 11.

The second rotor element 33 has the guide 42 into which the coupling part 41 engages and is thus arranged in a rotationally fixed manner in relation to the second rotor element 33. The second rotor element 33 is inserted into the stator body 11 from a base side 23 of the stator 10, preferably without the first rotor element 32 during assembly.

Figure 4:
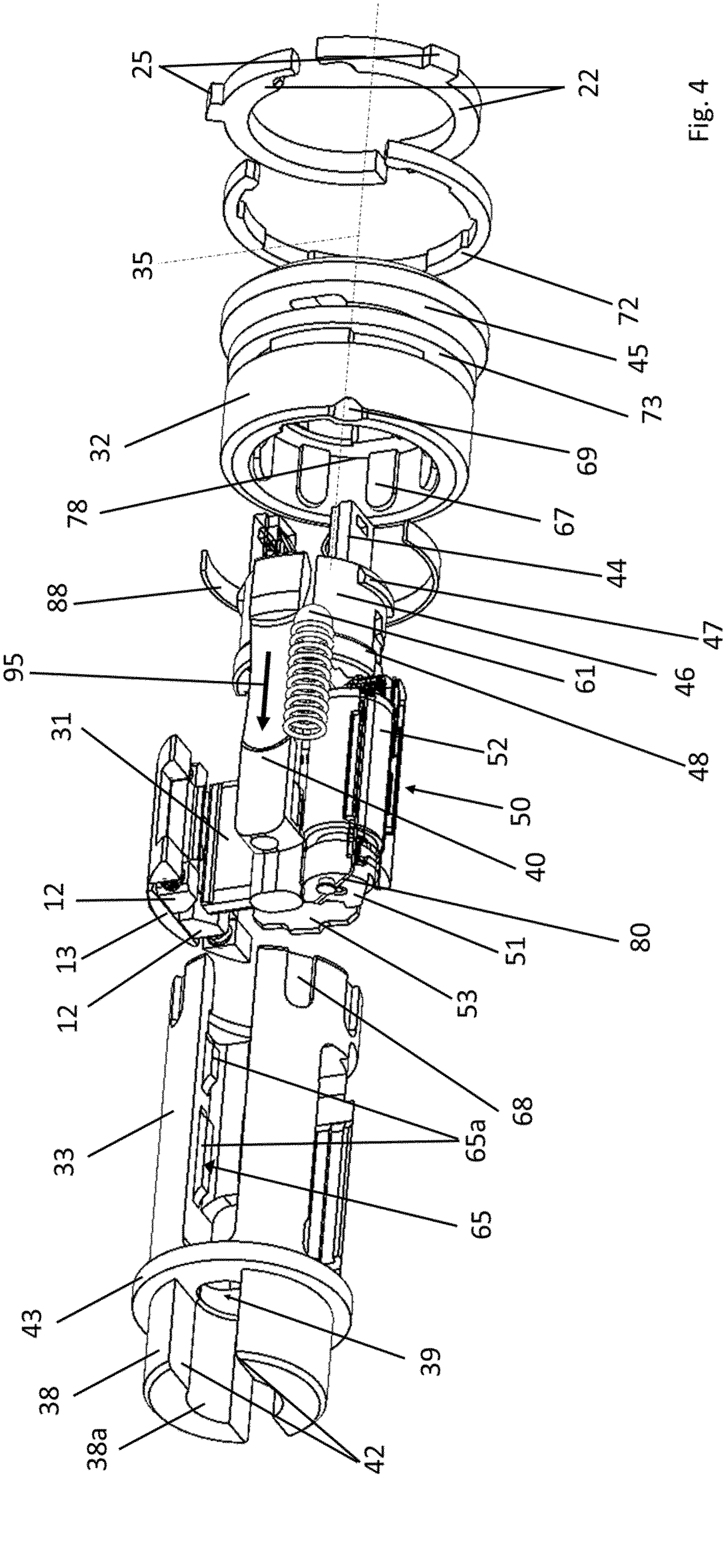

FIG. 4 shows the installation device 1 without cover 14, stator body 11 and coupling part 41 in a partially dismantled state. Shown is an extension element 40 according to the disclosure, which is designed to interact mechanically with the key 200. If the key 200 is inserted into the key channel 36, the key 200 moves the extension element 40 axially or parallel to the rotor axis 35 in the direction of the second rotor element 33 upon contact, as indicated by the arrow 95 on the extension element 40. The extension element 40 can be moved linearly between a removal position and an insertion position here. When the key 200 is inserted, the extension element 40 assumes the insertion position in which the extension element 40 is displaced in the direction of the driver 103 compared to the removal position. When the key 200 is removed, the extension element 40 assumes the removal position as represented in FIGS. 7 and 8.

Figure 6:
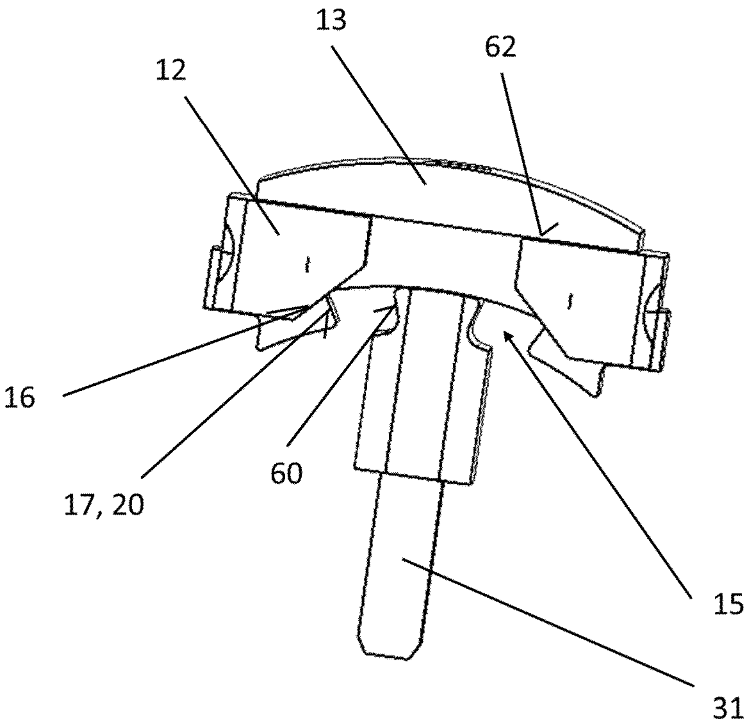
Figure 7:
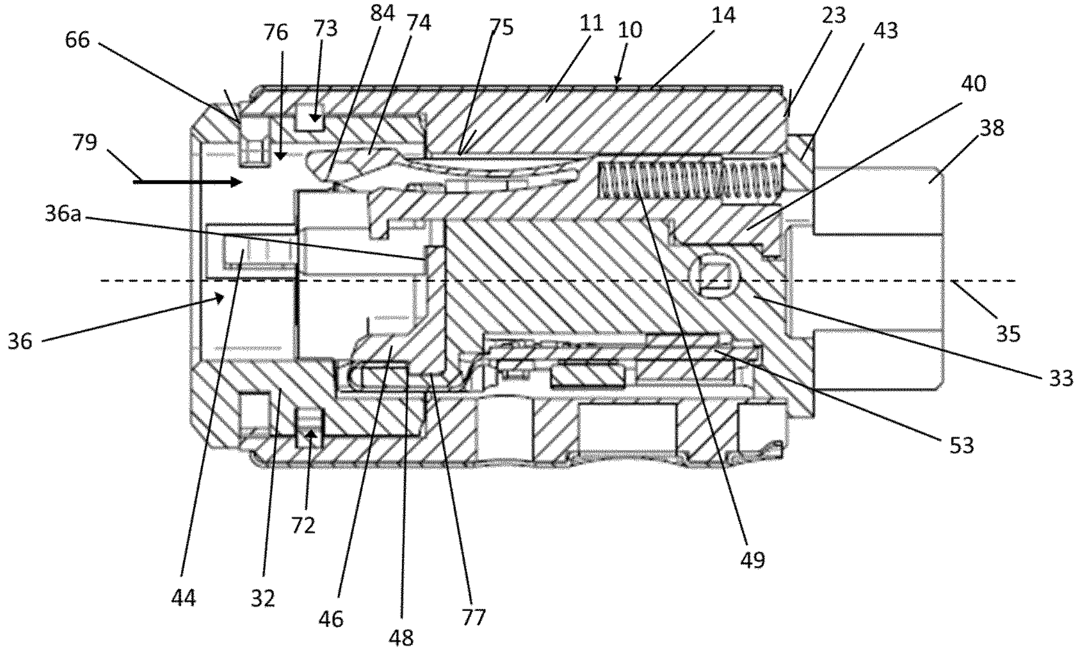
Figure 8:
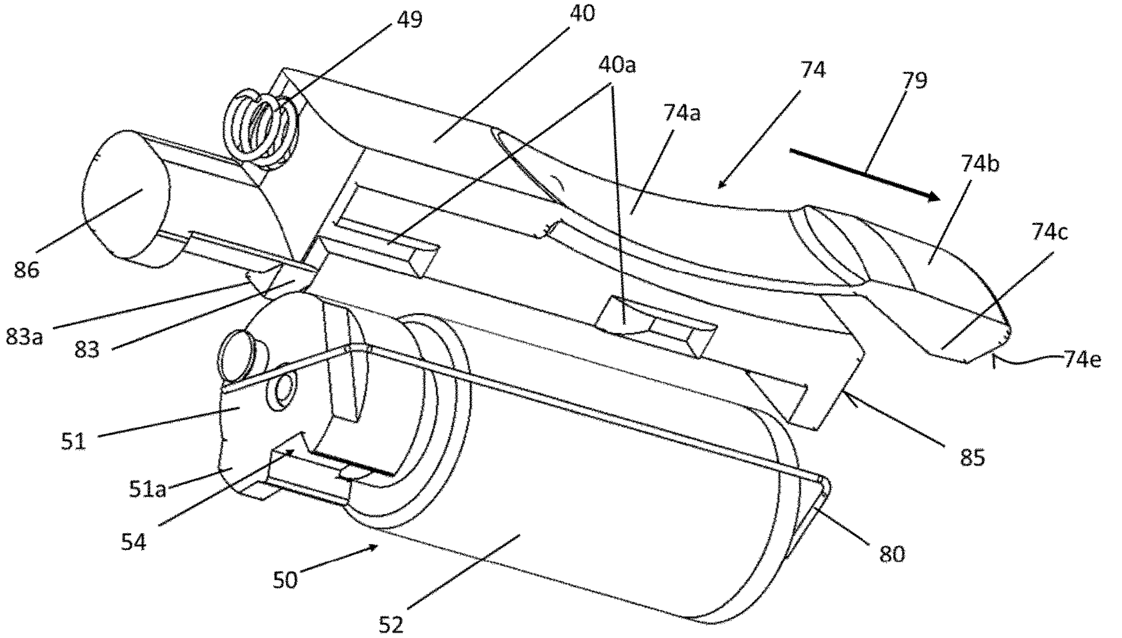

Because the extension element 40 according to the disclosure is provided, the key channel 36 can have a small depth (see FIG. 7). As a result, components that allow a rotation of the driver 103 only for authorised users are particularly well protected. These components are described below, in particular with reference to FIGS. 5 and 6.

As represented in FIG. 7, the key channel 36 ends with a wall 36*a*. As represented in FIG. 7, only a part of the extension element 40, which is designed to interact with the key 200, projects into the key channel 36. The wall 36*a* is substantially closed except for a section which is necessary for the extension element 40 to protrude into the key channel. Because the extension element 40 is designed to be filigree, at least with the part of the extension element 40 that projects into the key channel 36, the wall 36*a* can close off the key channel 36 and protect the components located behind it. The key channel 36 can be designed correspondingly short.

The extension element 40 thus extends the range of action of the key 200.

The rotor 30, for example the second rotor element 33, comprises a guide 65 to axially guide the extension element 40 between the removal position and the insert position. For this purpose, the guide 65 comprises rails 65*a*. The rails 65*a* cooperate with corresponding guide means 40*a* of the extension element 40, which are represented in FIGS. 8 and 9.

The guide 65 is designed as an open recess, with a contact surface 75 of the stator 10 delimiting the recess (see FIG. 7). As a result, the barrier device 1 can be designed to be compact.

Figure 9:
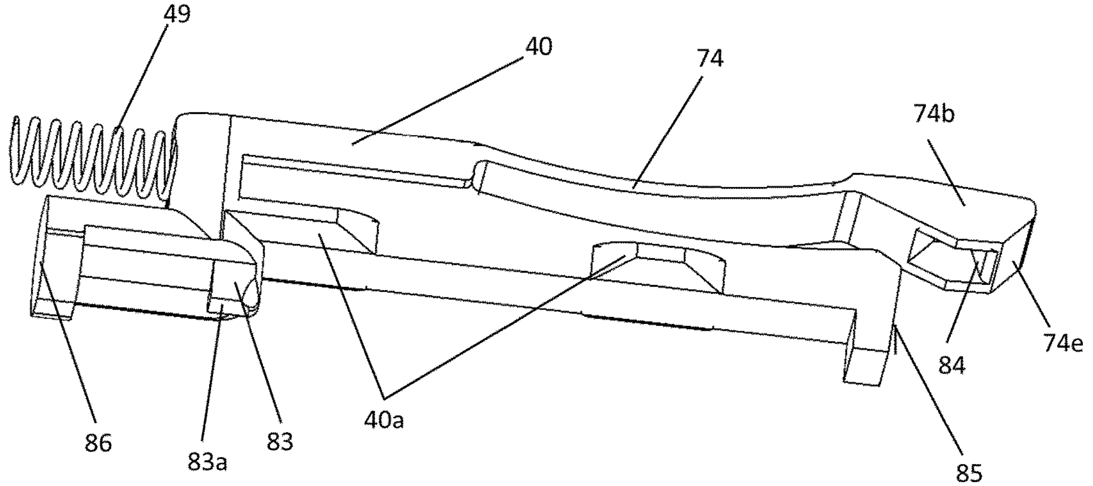

In order to push the extension element 40 from the removal position into the insertion position, the key engages an engagement surface 85 of the extension element 40 and displaces the extension element 40 (see FIGS. 8 and 9). The extension element 40 thereby moves the coupling part 41 (see FIG. 2) away from the rotor 30 in the direction of the driver 103 such that the coupling part 41 can come into rotational engagement with the driver 103.

A passage 39 is provided in the connecting section 38 so that the extension element 40 reaches the coupling part 41. Either the extension element 40 or the coupling part 41 can protrude through the passage 39 here.

A rotation of the key is transmitted via the first rotor element 32 to the second rotor element 33 and thus to the connecting section 38. The torque is transmitted from the connecting section 38 to the coupling part 41 and from there to the driver 103, provided that the coupling part 41 is located in the coupling position. The extension element 40 is not required to transfer the torque from the key 200 to the driver 103. This allows the extension element 40 to be configured in a filigree manner.

Figure 10:
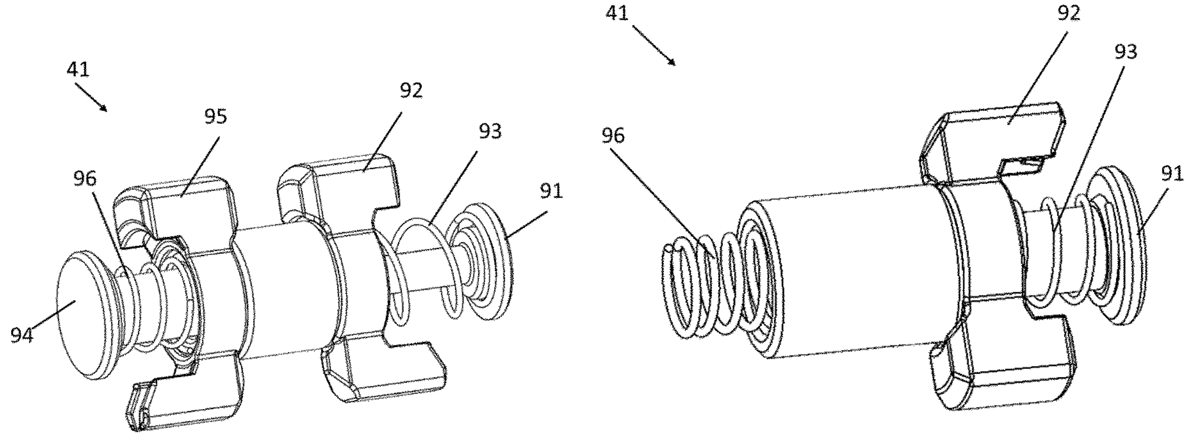

FIG. 10 shows a plurality of alternatives of a coupling part 41 of the locking device 100 according to the disclosure. The coupling part 41 shown on the left corresponds to the coupling part 41 shown in FIGS. 2 and 3. The coupling part 41 shown on the right can be used as an alternative to the coupling part 41 shown on the left without changing the barrier device 1 according to the disclosure. Both coupling parts can be used with a barrier device 1 according to the first or second exemplary embodiment.

Common features of both coupling parts 41 will first be described. As represented in FIG. 10, the coupling part 41 is designed in a plurality of parts. The coupling part 41 comprises a sliding element 91 as a first segment, a coupling element 92 as a second segment and a spring 93. The sliding element 91 is guided in a channel 38*a* of the connecting section 38.

The sliding element 91 is displaced by the extension element 40 when the extension element 40 moves from the removal position into the insertion position. The coupling element 92 is provided to be guided in the guide 42 and to be in operative connection with the driver 103 in the coupling position. If the sliding element 91 is displaced when the key 200 is inserted and the insert 105 and the coupling element 92 are located in a geometrically matching spatial position relative to one another, the coupling element 92 is also displaced via the spring 93, such that the coupling element 92 comes into the coupling position, i.e. into engagement with the insert 105 and thus into operative connection with the driver 103. If the sliding element 91 is displaced when the key 200 is inserted and the insert 105 and the coupling element 92 are in a spatial position that does not geometrically match one another, the spring 93 is tensioned and the coupling element 92 initially remains in the decoupling position until the insert 105 and the coupling element 92 can assume a geometrically matching spatial position relative to one another and the coupling element 92 reaches the coupling position due to the force of the spring 93.

In order to allow a small installation space for the barrier device 1, it is provided that the key 200 pushes the extension element 40 into the insertion position without an intermediate force accumulator. The extension element 40 pushes the coupling part 41 without an intermediate force accumulator. Rather, the force accumulator in the form of the spring 93 is provided outside an interior of the barrier device 1 in the connecting section 38.

The extension element 40 is designed to push the coupling part 41, but without being in form-fitting engagement with the coupling part 41 (see FIGS. 8 and 9). For this purpose, the extension element comprises a section 86.

In the coupling part 41 shown on the left, the coupling element 92 initially remains in the coupling position when the key is removed. However, in the removal position, the extension element 40 allows a movement of the coupling element 92 into the decoupling position. As a result, the driver 103 is connected to the stator 10 via the coupling element 92, the second rotor element 33 and the barrier element 31 such that the driver 103 cannot rotate when the key is removed. This provides good protection against manipulation.

A movement of the coupling element 92 into the decoupling position can take place, for example, by pressing on another sliding element 94. The sliding element 94 can, for example, be part of another locking device on the other side of the door. When a key is inserted into the other locking device, the sliding element 94 is displaced. As a result, a further coupling element 97 is pushed into a coupling position with the driver 103, either directly or by tensioning another spring 96. At least when the key of the locking device 100 according to the disclosure is removed, the coupling element 92 is displaced from the coupling position into the decoupling position.

The right coupling part 41 shown in FIG. 10 is used, for example, when a knob is used on the other side of the door. The knob is firmly connected to the driver 103. If the key 200 is removed from the locking device 100 according to the disclosure and the extension element 40 is moved into the removal position, the coupling element 92 will be pressed into the decoupling position by the force of the spring 96. The engagement surface 85 of the extension element and the section 86 of the extension element are preferably rigidly connected to one another.

This allows the extension element to be designed in a filigree manner.

The extension element 40 will be described in more detail later in connection with FIGS. 7 to 9.

A transmission element 44, here for example in the form of contact elements, is resiliently fastened to a housing 46 in order to establish a data and/or energy transmission connection with the key 200. This makes it possible to read electronic data, for example authentication information or an opening command, from the key 200 or to receive it from the key 200. An electronic control device 53 of the barrier device 1 in the form of a control board is coupled to the transmission element 44 in order to read out the data and, if necessary, evaluate it. If the check of the control device 53 shows that the user of the key 200 is authorised to open the associated door and/or if the control device 53 has an opening command, an electromechanical actuator assembly 50 will be activated.

The barrier device 1 also receives electrical energy from a battery of the key 200.

The actuator assembly 50 thereby comprises an electromechanical actuator 52, here in the form of an electric motor, on whose output shaft a blocking element 51 is arranged in a rotationally fixed manner.

The actuator assembly 50 with the electromechanical actuator 52 in the form of the electric motor and with the blocking element 51 on its output shaft has a spring element 80. The spring element 80 cooperates with the blocking element 51 in such manner that when the blocking element 51 moves from the starting position into the release position, i.e. when the blocking element 51 is rotated, the spring element 80 is at least temporarily tensioned in such manner that the spring element 80 pushes the blocking element 51 back in the direction of the starting position, i.e. rotates it back into a certain rotational position. A more detailed description of the interaction of the spring element 80 with the blocking element 51 follows in connection with FIG. 5.

Figure 5:
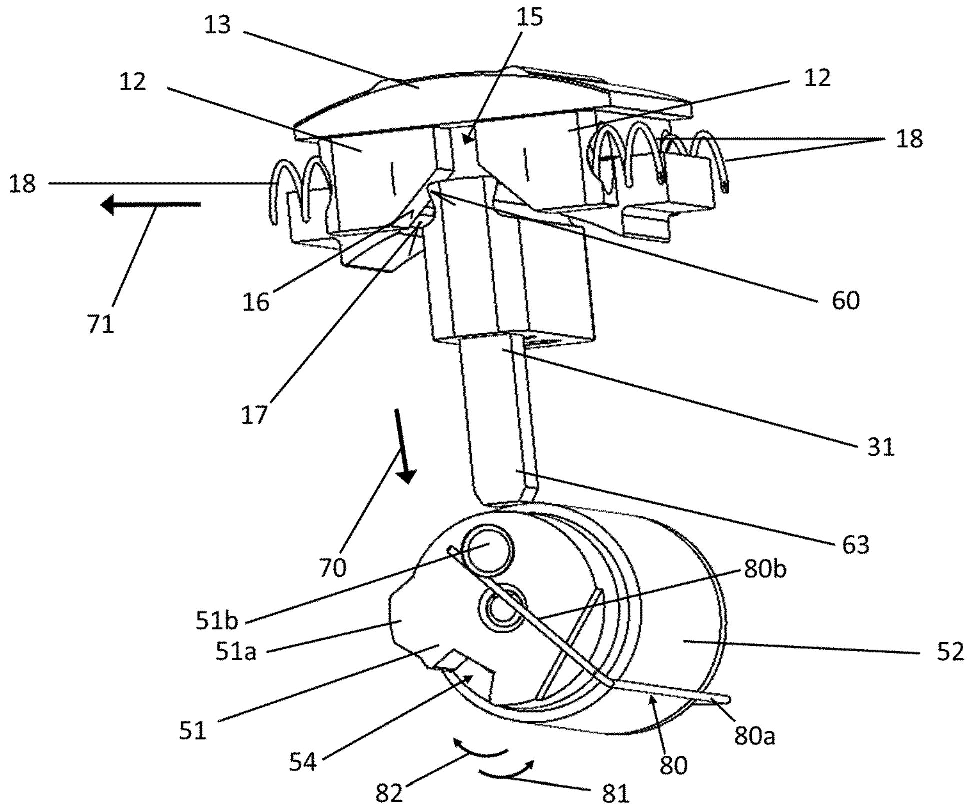

Furthermore, as shown in further conjunction with FIG. 5, a barrier element 31 of the barrier device 1 is provided, which is mounted in the second rotor element 33 so as to be linearly movable toward and away from the blocking element 51, preferably perpendicular to the rotor axis 35. In the first position shown here, the barrier element 31 is located in a barrier element recess 15 which is formed by the stator insert element 13 and the stator elements 12. This prevents the second rotor element 33 and thus the coupling part 41 from being rotated. Turning the inserted key 200 to unbolt the corresponding lock is thus prevented. In a second position of the barrier element 31, not represented, said barrier element is disengaged from the barrier element recess 15 of the stator 10. This makes it possible to rotate the rotor 30 in the stator 10 and thus the driver 103 in order to actuate the locking device and to release the closure.

FIGS. 5 and 6 show selected elements of the barrier device 1 from FIG. 4. FIG. 5 thereby shows the arrangement of the barrier element 31 in relation to the blocking element 51 and the stator insert element 13 together with stator elements 12. The blocking element 51 is rotatable between a release position in which a recess 54 of the blocking element 51 is located opposite the barrier element 31 such that the barrier element 31 can retract into the recess 54 and assume the second position, and a blocking position in which the recess 54 is not located opposite the barrier element 31 such that the barrier element 31 is prevented from retracting into the recess 54. FIGS. 4 and 5 represent blocking positions of the blocking element 51. The blocking position held by the blocking element 51 in the unactuated barrier device 1 is referred to as the starting position.

The barrier element 31 is designed at its contact section 63 facing the blocking element 51 to be able to retract into the recess 54 when the blocking element 51 is located in the release position and the recess 54 is located opposite the contact section 63 of the barrier element 31, i.e. points upwards in FIG. 5. This makes it possible for the barrier element 31 to move into the second position. In the blocking positions of the blocking element 51, however, the barrier element 31 must remain in the first position.

A first contact surface 16 of the stator elements 12 facing the barrier element 31 is designed to push the barrier element 31 in the direction of the blocking element 51 when the rotor 30 rotates further, i.e. into the second position in which the rotor 30 is freely rotatable relative to the stator 10. The first contact surface 16 is designed as an inclined surface which pushes the barrier element 31 into the second position.

The stator elements 12 are mounted on the stator insert element 13 so as to be movable between a first position and a second position. The stator elements 12 are pushed into the first position by means of spring elements 18. The spring elements 18 are mounted in the stator 10. The movement of the stator elements 12 from the first position into the second position according to the movement direction 71 is perpendicular to the movement direction 70 of the barrier element 31.

During a process for unlocking the rotor 30 relative to the stator 10, the barrier element 31 is initially located in the barrier element recess 15. Here, the barrier element 31 is guided in the rotor 30. In addition, the barrier element 31 rests on the first contact surfaces 16 of the stator elements 12. This centres the barrier element 31. This position of the barrier element 31 is called the rest position. In the rest position, the barrier element 31 is preferably arranged spaced apart from the blocking element 51.

A user now wants to unbolt the door and inserts the key 200 into the key channel 36. This starts an electronic communication between the key and the control device 53, which electronically determines whether the user is authorised.

If the user is authorised to unbolt the door, the control device 53 controls the actuator 52. The actuator 52, designed as an electric motor, rotates the blocking element 51 into the release position in which the recess 54 is located opposite the barrier element 31. If the rotor 30 is now set into rotational movement by means of the key 200, the barrier element 31 slides along one of the first contact surfaces 16 into the second position in which the barrier element 31 engages in the recess 54, with the barrier element 31 being pretensioned into the barrier element recess 15 by springs, not represented. The barrier element 31 is then moved in the movement direction 70 due to the rotation of the rotor 30.

The stator elements 12 remain in the first position here. This is made possible by the fact that the spring elements 18 exert a greater force on the stator element 12, along which the barrier element 31 slides, than the springs, not represented, which push the barrier element 31 upwards into the barrier element recess 15.

The rotor 30 can now rotate freely. The barrier element 31 slides along the first contact surfaces 16 into which the barrier element 31 is rotated. The barrier element 31 is surrounded by the first contact surfaces 16 in both directions of rotation such that the rotation in both directions when it rests on one of the first contact surfaces 16 causes the barrier element 31 to move into the second position. In order to provide first contact surfaces 16 in both directions of rotation, the barrier element recess 15 is surrounded on both sides by at least one first stator element 12 and one second stator element 12.

The stator 10 has, as shown in FIG. 6, second contact surfaces 17, which leave the barrier element 31 in the first position. The second contact surfaces 17 are used functionally when the user is not authorised to unbolt the door. The second contact surfaces are formed in or on the stator insert element 13. If the barrier element 31 is in the rest position, the second contact surfaces 17 are further away from the barrier element 31 than the first contact surfaces 16.

Preferably, the second contact surfaces 17 are also inclined, but opposite to the first contact surfaces 16 with respect to the movement direction 70 of the barrier element 31. The second contact surfaces 17 thus form an obtuse angle to the movement direction 70 of the barrier element 31.

At its end facing the stator insert element 13, the barrier element 31 has, as seen along the axis of rotation of the blocking element 51 and/or the rotor axis 35, a cross-section which has the shape of a symmetrical trapezoid tapering in the direction of the blocking element 51. The legs of this trapezoid form head surfaces 60 on the outside in relation to the barrier element 31. The head surface 60 and the corresponding contact surface 17 are inclined to the movement direction of the barrier element 31.

If the user is not authorised to unbolt the door, the following procedure occurs. The barrier element 31 is initially located in the rest position. A key 200 without locking authorisation is inserted into the key channel 36. The electronic data exchange shows that there is no authorisation to unbolt the door. Therefore, the actuator 52 is not activated and the blocking element 51 remains in a blocking position in which the recess 54 is not located opposite the barrier element 31, as represented in FIGS. 4 and 5. Rather, an outer circumference of the blocking element 51 is located opposite the barrier element 31.

If the rotor 30 is rotated, the barrier element 31 tries to slide along the first contact surface 16. However, this is not possible because the barrier element 31 rests on an outer circumference of the blocking element 31. Thus, the barrier element 31 cannot be pushed into the second position against the force of the springs (not shown).

Instead, the stator element 12, which is located in the direction of rotation of the barrier element 31, is pushed back by the barrier element 31 against the force of the spring 18 until the barrier element 31 rests on the second contact surface 17. The stator element 12 is now located in the second position. In this case, the head surface 60 of the barrier element 31 comes into contact with the corresponding second contact surface 17 located opposite one of the legs of the trapezoid. If an attempt is made to turn the rotor 30 with force using the key 200, the arrangement shown does not generate a greater force from the barrier element 31 on the blocking element 51.

The contact surface 17 is designed in such manner that the contact surface 17 holds the barrier element 31 in the first position. Thus, the rotor 30 remains blocked by the barrier element 31 such that the door cannot be unbolted.

Every contact surface 17 corresponds to a respective side of the head surface 60 of the barrier element 31 facing it. The surface 60 and the corresponding contact surface 17 are designed in such manner that the contact surface 17 is located between the surface 60 and the blocking element 51 when the barrier element 31 rests on the contact surface 17.

If an attempt is made to rotate the rotor 30 further, the barrier element 31 slides away from the blocking element 51 against the movement direction 70. This is achieved by the inclination of the second contact surface 17. The barrier element 31 can slide with the head surface 60 along the second contact surface 17. Thus, the barrier element 31 and the blocking element 51 can be spaced apart from each other when they rest on the second contact surface 17. Additionally or alternatively, the forces acting on the barrier element 31 during further attempted rotation of the rotor 30 are diverted into the second contact surface 17. This is helped by the fact that the head surfaces 60 correspond to the second contact surfaces and thus the barrier element 31 lies flat on the second contact surface.

This prevents damage to the blocking element 51, and it does not absorb the forces that arise when an attempt is made to forcibly rotate the rotor 30 in the stator 10. In particular, this makes it possible to design the blocking element 51 in a filigree manner and, for example, to mount it only on one side or to accommodate it on a thin shaft of the electromechanical actuator 52 designed as a motor.

The barrier element recess is provided with the reference numeral 15. FIG. 6 shows the arrangement of FIG. 5 seen from one end of the barrier element 31, only without blocking element 51. Here, the stator elements 12 are located in the second position. The same reference numerals in FIG. 6 are deemed to be described in FIG. 6 due to the description of FIG. 5.

Furthermore, with regard to FIG. 5, the spring element 80 is shown which encompasses the blocking element 51 and the electromagnetic actuator 52. The spring element 80 is rigidly clamped on the rear side with its end section there in a manner not shown, and the spring element 80 as a torsion spring has a torsion leg 80*a* which merges into a contact leg 80*b* which is angled approximately 90° therefrom and which is pretensioned against a pin 51*b* on the blocking element 51. The pretensioning of the contact leg 80*b* against the pin 51*b* is effected via the torsion of the torsion leg 80*a* such that the blocking element 51 is rotationally pretensioned into the starting position shown here, in which the blocking element 51 prevents a movement of the barrier element 31 and the rotor 30 is not rotatable in the stator 10. In this position, the recess 54 is not aligned with the barrier element 31.

If the electromechanical actuator 52 is energised, the blocking element 51 is rotated counterclockwise according to the arrow 81 in the view represented here such that the pretensioning in the torsion leg 80*a* of the spring element 80 changes as a result of this rotation and ultimately decreases again after passing through a dead centre. Through this rotation of the blocking element 51, the recess 54 can be rotated into the corresponding release position with the barrier element 31. In order to lock the position of the recess 54 corresponding to the barrier element 31, a stop 83 of the extension element is provided, which is explained in more detail in connection with FIG. 7 and against which a retaining cam 51*a* of the blocking element 51 can come to rest.

If the blocking element 51 is rotated into the release position, the retaining cam 51*a* can come into contact against the stop 83 when the extension element 40 is located in the insertion position. This holds the blocking element 51 in the release position.

The spring element 80 thereby presses the blocking element 51 in the direction of the release position after passing through the dead centre. In the release position, the spring element 80 presses the blocking element 51 against the stop 83 of the extension element 40.

If the extension element 40 is moved back into the removal position against the movement direction 95, the stop 83 comes out of engagement with the retaining cam 51*a*. The blocking element 51 then rotates back into the starting position, with the reverse rotation being effected by applying force to the spring element 80. The rotation also occurs counterclockwise according to arrow 81. Thus, in the removal position, the extension element 40 allows the blocking element 51 to move into the starting position by means of the spring element 40.

Without manipulation, the blocking element 51 always rotates counterclockwise 81. However, by manipulation, the blocking element 51 can also be rotated clockwise 82, since the blocking element 51 is arranged on the output shaft of the actuator 52. The movement of the blocking element 51 from the starting position into the release position in the direction of rotation 82 is made more difficult by a strong increase in the spring tension 80. On the other hand, the movement of the blocking element 51 from the starting position into the release position in the direction of rotation 82 is prevented when the extension element is located in the insertion position.

In the insertion position, the extension element 40, in particular the stop 83, prevents the blocking element 51 from reaching the release position in the second direction of rotation. Rather, before reaching the release position, the retaining cam 51*a* would hit an area 83*a* of the stop 83 represented at the bottom in FIG. 8. The first direction of rotation, on the other hand, is particularly protected against manipulation due to the longer angle of rotation range required to reach the release position.

Proceeding from the starting position, the blocking element 51 can be movable in a first direction, in particular a first direction of rotation 81, and in a second direction, in particular in a second direction of rotation 82, with the spring element 80 and the blocking element 51 cooperating in such manner that the spring element 80 is at least temporarily tensioned both during a movement in the first direction and during a movement in the second direction.

Figure 11:
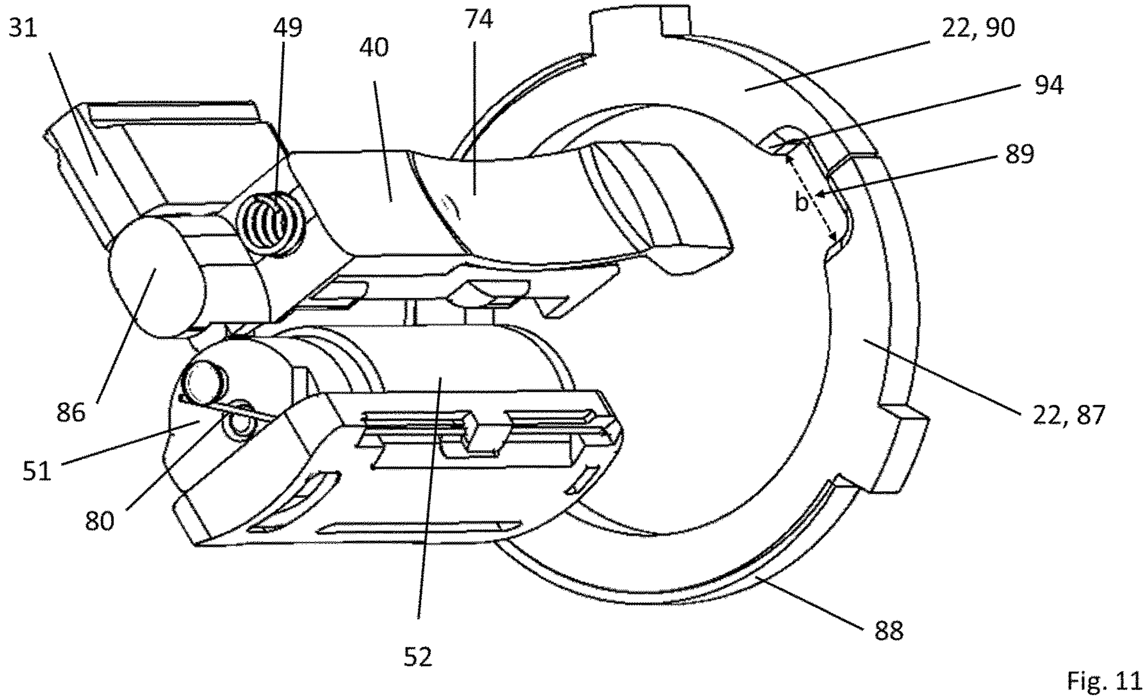

As can be seen from FIG. 11, FIG. 7 and from a combination of FIG. 11 and FIG. 7, the extension element 40 extends past the blocking element 51, the barrier element 31, the control device 53 and the actuator 52. Thus, the components that enable an authorised user to rotate the rotor 30 are arranged radially adjacent to the extension element 40. The blocking element 51, the barrier element 31, the control device 53 and the actuator 52 are protected behind the wall 36*a*.

FIG. 7 shows a sectional view through the barrier device 1, with the stator 10 being shown with the stator body 11, and in the stator body 11 are shown the first rotor element 32 and the second rotor element 33. The first rotor element 32 has the key channel 36 into which the key 200 shown in FIG. 1 can be inserted. The second rotor element 33 merges into the connecting section 38, which has already been described in connection with FIG. 2. The sectional view is selected such that the extension element 40 is represented within the stator body 11 and at the same time the second rotor element 33 is represented in cross-section. The extension element 40 extends off-centre through the stator body 11 such that the extension element 40 is at a radial distance from the central rotor axis 35.

A housing 46 also serves to axially fasten the rotor elements 32, 33 to one another. For this purpose, the housing 46 comprises a latching element 48 which latches into the second rotor element 33. For this purpose, the second rotor element 33 comprises a groove 77. The housing 46 also comprises a first latching element 47 which latches into the first rotor element 32. For this purpose, the first rotor element 32 comprises an edge 78. The housing 46 is connected to the transmission device 44 (see FIG. 4). The housing 46 comprises the wall 36*a*.

The second rotor element 33 has a projection 43, with the projection 43 being formed in one piece with the remaining second rotor element 33, with the axial position relative to the stator 10 being determined in a spatial direction by the projection 43 in that the projection 43 rests against a base side 23 of the stator 10 or the stator body 11.

The first rotor element 32 is axially fixed by a snap ring 72, both in the direction of arrow 79 and against the direction of arrow 79. The snap ring 72 is arranged in a groove 73 of the first rotor element 33.

The extension element 40 is pushed into the removal position by a spring 49, such that the force applied by the spring 49 counteracts the insertion movement of the key 200.

The extension element 40 has a resilient engagement element 74 (see also FIGS. 8 and 9). The engagement element 74 is provided to engage into the key 200. By engaging the engagement element 74 in the key 200, the extension element 40 can be moved from the insertion position into the removal position when the key is removed. Although the spring 49 also supports the movement of the extension element 40 into the removal position, the spring 49 can be manipulated. The engagement element 74 prevents manipulation.

The engagement of the engagement element 74 takes place in that the engagement element 74 in the insertion position rests on the inner side 75 of the stator body 11 as the contact surface 75 against the resilient effect of the engagement element 74 and is pushed to engage in the key 200. In the removal position, however, the engagement element 74 is located in a cavity 76 in the interior of the first rotor element 32. This makes it possible for the engagement element 74 to slide out of the key 200 due to the resilient force of the engagement element 74. In addition, the engagement element 74 comprises a chamfer 84 shown in FIG. 9 as a sliding surface, which slides along a corresponding chamfer 202 of the key 200 (see FIG. 12) as a sliding surface of the key and thus guides the engagement element 74 out of engagement with the key 200. The cavity 76 thereby merges into the key channel 36.

The engagement element 74 can be designed such that the extension element 40 comes out of engagement with the key 200 either by the resilient force alone, by the chamfer 84 or by a combination of the resilient force and the sliding of the chamfer 84 when the key 200 is removed.

When the key 200 is inserted, which pushes the extension element 40 by means of the engagement surface 85, the engagement element 74 is pushed against the resilient force by the contact surface 75 in the direction of the key during the pushing such that the engagement element 74 engages the key.

The engagement element 74 is designed in one piece with a base body of the extension element 40, with the engagement element 40 having a spring section 74*a*. The spring section 74*a* is designed like a leaf spring. At the free end of the spring section 74*a* there is located a spring head 74*b*, with a latching lug 74*c* with the chamfer 84 being formed on the spring head 74*b*, which can engage into a corresponding depression in the key 200. The latching lug 74*c* is aligned towards the base body of the extension element 40 and has an inclination 74*e* which can enable or facilitate engagement of the latching lug 74*c* into the depression in the key 200.

Particularly preferably, the entire extension element 40 is formed in one piece with the section 86, the engagement surface 85 and the engagement element 74.

The section 86 of the extension element 40 is offset with respect to the base body of the extension element 40, with the spring 49 being inserted into the base section of the extension element 40 adjacent to the section 86. The front side of the section 86 serves to initiate a thrust movement into the coupling part 41, as shown in FIG. 2. Thus, the extension element 40 is designed to be angled.

Figure 12:
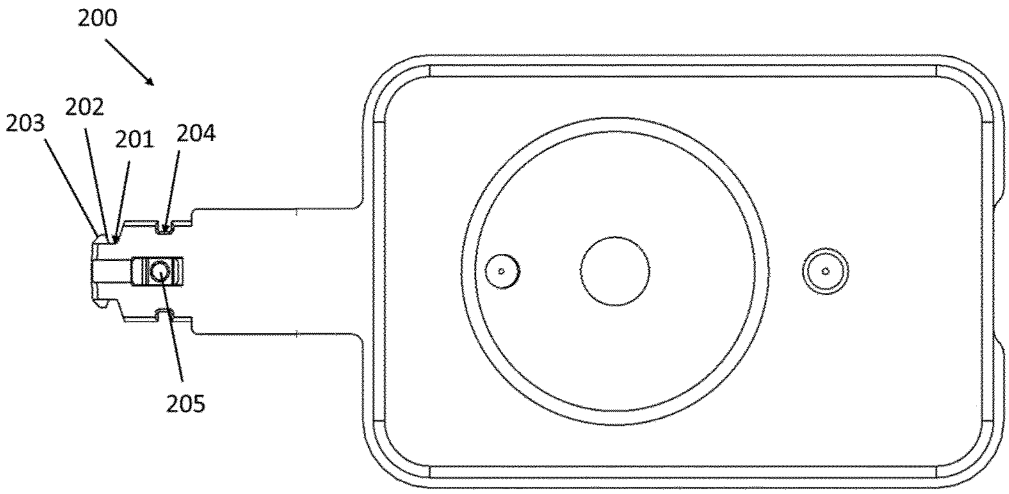

As represented in FIG. 12, the key 200 comprises a first depression 201 in which the engagement element 74 can engage. The key 200 comprises the sliding surface 202. The key 200 comprises an inclination 203 to cooperate with the inclination 74*e*. The key 200 has contact elements 205 for contacting the contact elements 44.

The first rotor element 32 has a larger diameter than the second rotor element 33. In this way, the cavity 76 can be provided.

FIG. 11 represents the extension element 40 in a perspective view adjacent to the electromagnetic actuator assembly 50. The extension element 40 is pretensioned with the spring 49, with the pretensioning direction corresponding to the direction in which the extension element 40 is held in the removal position for the key 200. In this position, the engagement element 74 can engage the key 200 when the key 200 is inserted by an operator or release the key 200 when it is removed. During the insertion movement from the removal position into the insertion position of the key 200, the spring 49 is compressed.

An annular projection 22 is shown consisting in particular of half-shell-like parts 87, 90. The parts are inserted into a circumferential groove 45 of the first rotor element 32, see FIG. 4. Outwardly protruding projections 25 of the annular projection 22 fix the parts of the projection 22 in the stator body 11 in their relative position to one another and to the stator body 11. Thus, the projection 22 remains in the stator 10 and does not rotate with the rotor 30.

The annular projection 22 cooperates with the inserted key 200 preferably in a bayonet-like manner as a key removal lock. For this purpose, the projection 22 engages into a recess 204 of the key. The projection 22 prevents the key 200 from being pressed by the spring 49 of the barrier device 1 when the key 200 is inserted such that the extension element 40 prematurely reaches the removal position and thus the blocking element 51 reaches the blocking position.

When the bayonet closure is released, i.e. in the key position in which the recess of the key is arranged in the gap 89, the spring 49 would force the extension element 40 and, via the engagement surface 85, also the key 200 out of the barrier device 1. To prevent this, there is a crescent-shaped spring device 88 which compresses the gap 89 such that the gap 89 has a smaller width b than the key 200. This prevents the spring 49 from pushing the key through the gap 89. Rather, a user must actively pull the key out of the barrier device 1 against the force of the spring device 88.

The installation device 1 can also be used in other locking devices, for example in a half cylinder, a knob cylinder, a furniture cylinder or a padlock. The installation device can also be used in switching elements.

It is conceivable that the coupling part 41 is missing. Rather, locking devices according to the disclosure can be provided in which the driver 103 is rigidly fastened to the rotor 30. The driver 103 can also be used as a bolt itself, e.g. in a furniture lock.

The driver 103 and the insert 105 can be formed in one piece with each other.

The stator insert element 13 and the stator body 11 can be formed in one piece. It is also conceivable that the cover 14 is missing and the stator body is fastened directly in the locking device housing 101.

In a further alternative of the disclosure, the barrier device 1 is not designed as an installation device 1. Rather, the stator 10 is designed as a locking device housing 101. Thus, the rotor 30 can be designed to be inserted directly into a locking device housing 101, in particular in the locking cylinder housing 101. In this case, the barrier device 1 comprises the driver 103 and, if applicable, the coupling part 41.

The transmission device 44 can, for example, be designed as a contact element for electrically contacting the key.

The first and second rotor elements 32, 33 can be formed in one piece as first and second rotor sections.

The design of the disclosure is not restricted to the preferred exemplary embodiment indicated above. In fact, a number of variants is conceivable which make use of the represented solution even in the case of fundamentally different designs. All features and/or advantages emerging from the claims, the description or the drawings, including constructive details or spatial arrangements, may be essential to the disclosure by themselves and in the most varied combinations.

The invention claimed is:

1. An electromechanical barrier device for a closure element or for a switching element comprising:
- a stator and
- a rotor, wherein the rotor is mounted in the stator, wherein
- the barrier device comprises an extension element, wherein the extension element is moved in an axial direction between an insertion position and a removal position,
- wherein the barrier device comprises a barrier element, wherein in a first position, the barrier element prevents the rotor from being rotatable relative to the stator, wherein in a second position, the barrier element enables the rotor to be rotatable relative to the stator,
- wherein the barrier device comprises a blocking element, wherein in a release position, the blocking element allows the movement of the barrier element from the first position into the second position and in a blocking position, prevents the movement of the barrier element from the first position into the second position, wherein an actuator serves to enable a movement of the blocking element from the blocking position into the release position, and wherein a starting position and the release position is assumed by the blocking element, wherein the extension element and the blocking element are designed such that the extension element in the removal position allows a movement of the blocking element from the release position into a blocking position, into the starting position.

2. The barrier device according to claim 1, wherein the extension element extends in the axial direction at least in the insertion position along an electronic control device, along the actuator and/or past the barrier element, wherein the electronic control device controls the actuator in order to enable the barrier element to move from a first position into a second position.

3. The barrier device according to claim 1, wherein the extension element is designed to establish an operative connection between the rotor and a driver for transmitting a torque from the rotor to the driver, wherein the barrier device is designed to transmit the torque from the rotor to the driver without incorporating the extension element.

4. The barrier device according to claim 1, wherein the rotor comprises a connecting section, wherein the connecting section comprises a guide for guiding a coupling part and/or for transmitting a torque from the rotor to the coupling part, wherein the connecting section is arranged outside the stator.

5. The barrier device according to claim 1, wherein the extension element in the removal position allows the operative connection of a coupling part with the driver to be broken and/or the extension element leaves the coupling part, a coupling element of the coupling part, in the connection with the driver when the extension element moves from the insertion position into the removal position.

6. The barrier device according to claim 1, wherein the extension element is moved from the removal position into the insertion position when a key is inserted and/or is moved from the insertion position into the removal position when a key is removed.

7. The barrier device according to claim 1, wherein the barrier device comprises a key channel for inserting a key, wherein the extension element comprises a resilient, engagement element, for engaging the key, wherein the engagement element is designed, under mechanical tension, to be in operative connection with the key in such manner that the extension element is moved, from the insertion position into the removal position when the key is removed.

8. The barrier device according to claim 7, wherein the barrier device, the stator, comprises a contact surface for the extension element, wherein the resting of the engagement element on the contact surface under tension produces the operative connection with the key, wherein the barrier device, the rotor, comprises a cavity in which the engagement element comes out of operative connection with the key.

9. The barrier device according to claim 7, wherein the engagement element comes out of operative connection with the key through a resilient effect and/or wherein the engagement element comprises a sliding surface, wherein the engagement element is designed such that the sliding surface slides along a corresponding sliding surface of the key and thus the engagement element comes out of operative connection with the key.

10. The barrier device according to claim 1, wherein the extension element comprises an engagement surface for resting on the key so that the extension element is moved by the key from the removal position into the insertion position.

11. The barrier device according to claim 4, wherein the extension element is designed in one piece and/or is designed to be angled, wherein a section of the extension element which is arranged close to the rotor axis serves to move the coupling part.

12. The barrier device according to claim 1, wherein the blocking position and the release position is assumed by the blocking element, wherein the extension element and the blocking element are designed such that the extension element (40) in the insertion position blocks a movement of the blocking element from the release position into a blocking position, into a starting position.

13. The barrier device according to claim 1, wherein the barrier device comprises the blocking element, wherein a starting position and the release position is assumed by the blocking element by rotating the blocking element, wherein the extension element and the blocking element are designed such that in the insertion position, a movement of the blocking element from the starting position into the release position is possible in a first direction of rotation and is blocked in a second direction of rotation, wherein an angle of rotation (a) between the starting position and the release position in the first direction of rotation is greater than an angle of rotation (B) between the starting position and the release position in the second direction of rotation.

14. The barrier device according to claim 1, wherein the rotor comprises a first rotor section and a second rotor section, wherein the first rotor section comprises a larger diameter than the second rotor section, wherein the extension element is arranged in the first rotor section and in the second rotor section.

15. A locking device with a barrier device according to claim 1 and with a coupling part, wherein the coupling part is designed in a plurality of parts, wherein a first segment of the coupling part is designed to be moved by the extension element when the extension element moves from the removal position into the insertion position, wherein a second segment of the coupling part is provided to be connected to the driver in a rotationally fixed manner, wherein the first segment and the second segment are connected elastically.

16. The locking device according to claim 15 with a locking device housing, wherein the barrier device is received in the locking device housing.

17. A locking system with a barrier device according to claim 16, wherein the locking system comprises a key.

* * * * *